United States Patent [19]

Komons

[11] Patent Number: 4,581,930
[45] Date of Patent: Apr. 15, 1986

[54] AVERAGE MASS FLOW RATE METER USING SELF-HEATED THERMISTORS

[75] Inventor: Michael Komons, Peapack, N.J.

[73] Assignee: Ebtron, Inc., Peapack, N.J.

[21] Appl. No.: 645,746

[22] Filed: Aug. 30, 1984

[51] Int. Cl.$^4$ ............................................... G01F 1/68
[52] U.S. Cl. ........................................................ 73/204
[58] Field of Search ........................................... 73/204

[56] References Cited

U.S. PATENT DOCUMENTS 4,413,514 11/1983 Bowman ................................. 73/204
4,476,720 10/1984 Dsmail et al. ........................... 73/204
4,494,406  1/1985 Komons et al. ......................... 73/204

Primary Examiner—Herbert Goldstein
Attorney, Agent, or Firm—Charles E. Temko

[57] ABSTRACT

A thermal type flow meter for measuring the mass flow rate of a fluid medium especially that of a gas in a duct, said meter comprising a plurality of thermistors operated electrically in the "self-heated" mode located on the trailing edge of rigid, rectangular members oriented with the long axis perpendicular to the primary direction of flow. The thermistors are located strategically throughout transverse plan of the duct. Each sensor (thermistor) is located substantially at the center of the downstream end of a right circular cylinder. The voltage drops through all of the thermistors located in a two-dimensional array oriented normal to the flow direction are summed electrically using an operational amplifier. Due to both the geometrical location of the sensors and the characteristics of thermistors in the self-heated mode, the voltage drop across each sensor is linearly proportional to the local mass flow velocity. This allows the summed output from all of the flow dependent sensors to represent a true average of the flow in a duct providing a sufficient number of sensors exist to reveal the overall flow patterns in the duct.

2 Claims, 7 Drawing Figures

AVERAGE MASS FLOW RATE METER USING SELF-HEATED THERMISTORS

RELATED APPLICATION

Reference is made to co-pending application Ser. No. 452,790 filed Dec. 23, 1982, and assigned to the same assignee as the present application, this application disclosing and claiming a related invention.

BACKGROUND OF THE INVENTION

This invention relates generally to the field of mass flow measurement in fluids, particularly in fluid flows in ducts where the fluid velocity varies substantially throughout a transverse plane across the duct.

The individual sensors making up the whole of the device can generally be referred to as a type of thermal anemometer which is a well known method of determining mass flow by measuring the electrical energy being dissipated in a heated element which is exposed to the flow and is exactly balancing the heat transfer to the flow due to its increased temperature. Examples of prior art in thermal anemometer sensors and corresponding circuits are shown in U.S. Pat. Nos. 3,138,025, 3,333,470, 3,352,154, 3,604,261, 3,900,819, 4,024,761, and 4,206,638 as discussed by Djorjup (U.S. Pat. No. 4,279,147). This basic device has been improved upon by several inventors. Peter (U.S. Pat. No. 4,213,335), for example, shows an improvement by placing the active sensors of his anemometer so that they are substantially parallel to the streamlines of the flow into which they are placed. The major improvement is to protect the sensors from dirt build up which significantly alters calibration.

My invention is also concerned with the placement of a plurality of sensors (thermistors) in a duct in such a fashion as to yield, through electrical means, a signal which is representative of the true mean velocity of the fluid medium. While not specifically discussed by Peter, others have considered the placement of an array or continuous string of sensors in a duct to provide sufficient coverage. Tatum (U.S. Pat. No. 1,240,797) teaches the usefulness of disposing a temperature dependent resistor uniformly throughout the conduit to provide an average temperature. It should be pointed out that temperature dependent resistors are commonly found with linear transfer functions supporting the accuracy of this concept. However, the average flow speed obtained with Tatum's U.S. Pat. No. 1,240,797 device would be valid only when the flow within the conduit is nearly uniform. Although Tatum discusses rectangular support members within a circular duct, it is noted that such supports as shown in the embodiments discussed below located in a rectangular duct would follow easily from what he teaches. Similarly, Webb (U.S. Pat. No. 3,472,080) discusses the use of separate vertical and horizontal members made up of flow sensitive temperature dependent resistors aligned to form a grid work and produce an overall average velocity of the flow.

In these known devices, especially in the case where a plurality of sensors are used to reveal details of the flow profile in a duct, the outputed "average" flow within a duct is subject to substantial errors due to the inherent non-linear transfer function associated with these types of prior art devices. The error obtained by a linear algebraic average of the outputs of several "non-linear" sensors as proposed by others depend on the non-uniformity of the flow field passing over the sensor array but can be substantial in mildly contorted flows.

The thermistors discussed in this disclosure are subject to the same shifts in calibration as are expected in other thermal anemometers when the ambient temperature of the fluid medium passing the sensors changes. Djorup (U.S. Pat. No. 4,279,147) teaches the usefullness of placing one active sensor pointing in a direction 180° away from another sensor and using the difference in the output from the two sensors to indicate flow direction. In my invention, the difference between sensors exposed to the flowing medium and ones shielded entirely from the flow are used to correct for changes in the temperature of the ambient medium.

BRIEF DESCRIPTION OF THE DRAWINGS

In the drawings, to which references are made in the specifications, similar reference characters have been employed to designate corresponding parts throughout the several views.

SUMMARY OF THE INVENTION

It is a primary object of this invention to provide a thermal anemometer whose electrical output (in terms of voltage) is linearly proportional to the velocity of the flow of fluid about it so that an array of said sensors may be assembled within a duct and give a true average of the flow within the duct.

It is a further purpose of this invention to provide a means by additional sensor(s) shielded from the flow to compensate the output of the sensor arrays for changes in ambient temperature.

This is accomplished by using an array of standard thermistor beads located throughout the duct at the trailing edge of transversely extending support centered at the downstream exit of right circular cylindrical tubes oriented in the direction of flow. The thermistors are heated with a constant electrical current and the output from the indivddual sensors in the array (voltages) are summed by means of an operational amplifier.

DESCRIPTION OF THE INVENTION

Figure 1:
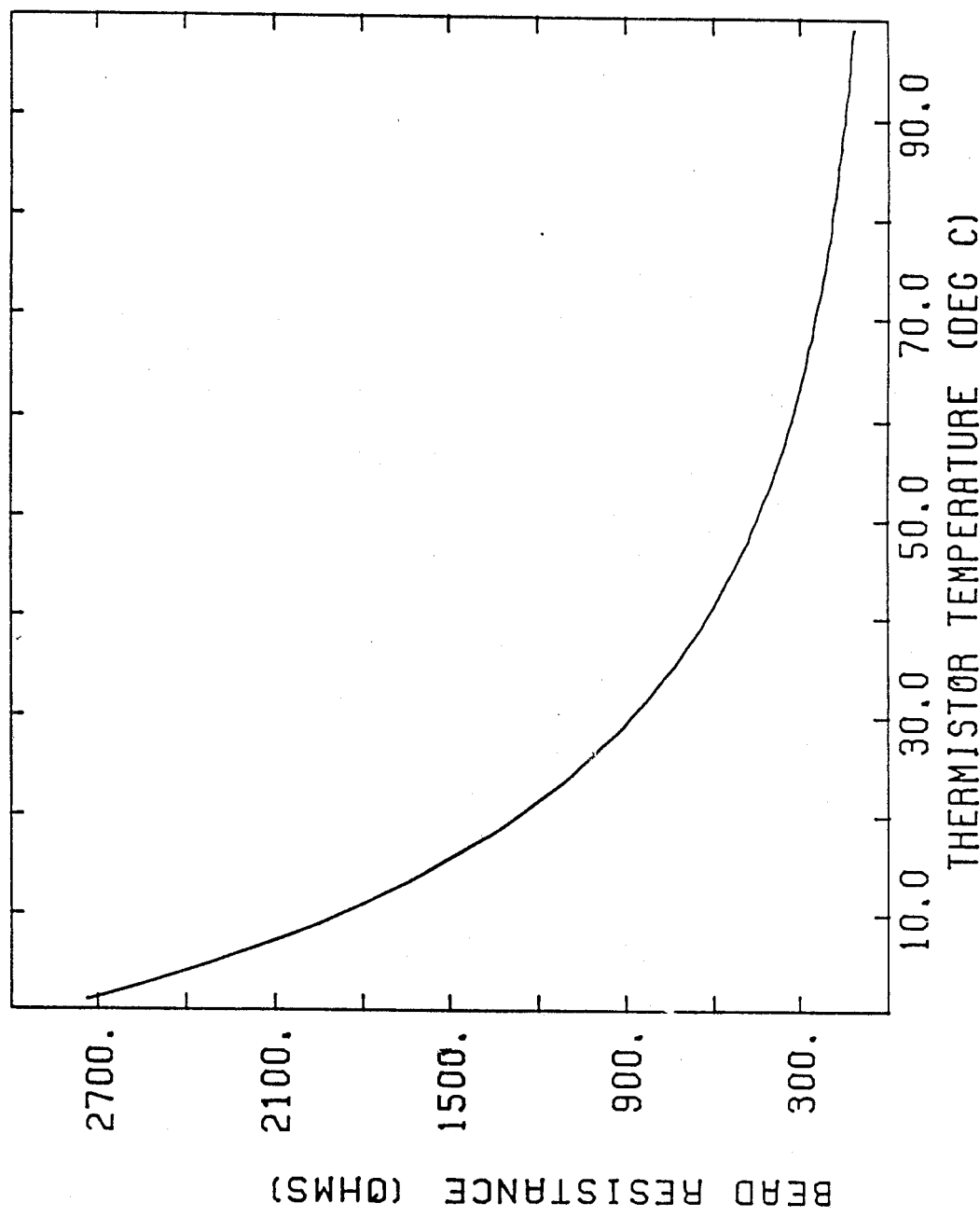
FIG. 1 is a graphic representation of typical dependency on temperature of a thermistor.

The present construction being of the thermal anemometer type, differs from previous constructions in several ways. Of most signigicance is the use of thermistors as the active sensor. A performance curve for a thermistor typical of those which are usable in the invention is shown in FIG. 1. Here, resistance is plotted as a function of temperature. For most industrial applications, the thermistor is used to measure temperature and it is the "exponential" behavior of the device which is utilized. It should be noted that the temperature dependent resistors commonly associated with thermal anemometry have a substantially linear change in resistance with temperature.

Figure 2:
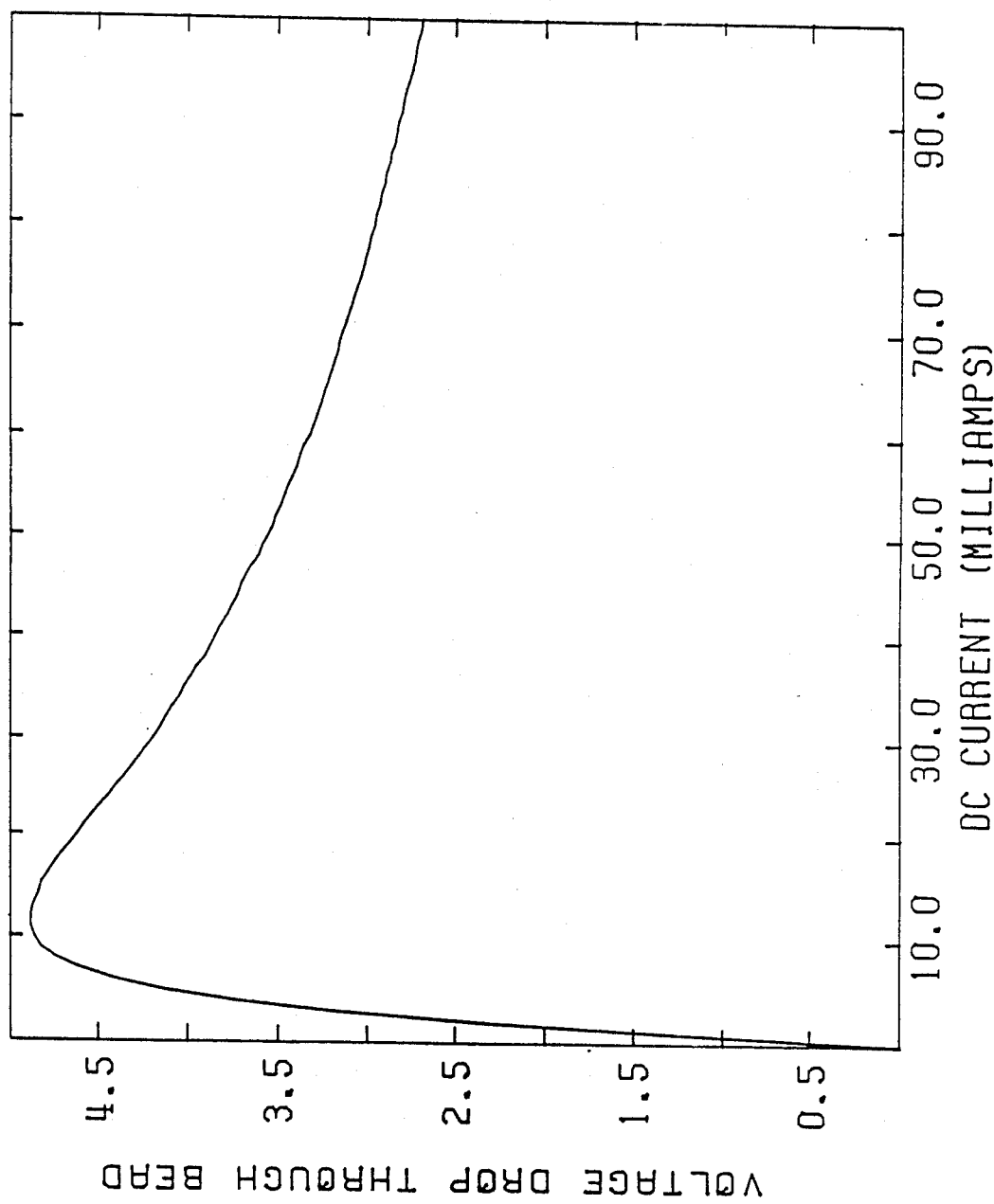
FIG. 2 is a graphic representation of the voltage/current characteristics of a "self-heated" thermistor.

If a significant amount of current (say several milliamperes) is pushed through a thermistor, its temperature will rise and a balance will exist between the electrical energy being dissipated within the thermistor and the heat transfer into the ambient fluid. The heat transfer will be a function of any flow about the bead and therein lies the velocity sensitivity of the "Self-heated" thermistor. The dependence of resistance on temperature is usually written as:

$$R = R_0 \exp\left[B\left(\frac{1}{T} - \frac{1}{T_0}\right)\right] \quad (1.)$$

where R is the resistance, $R_0$ is a reference resistance at Temperature, $T_0$, and B is the material constant of the thermistor. Heat transfer via conduction is the mechanism of most importance in a still fluid and heat transfer via forced convection will dominate when there is flow about the termistor bead. In either case, the energy balance can be written:

$$E \cdot I = H(T - T_a) \quad (2.)$$

where E is the voltage drop across the thermistor, I the current through it, and H is a heat transfer coefficient. the unsubscripted T is the temperature of the bead while the subscripted T is the temperature of the ambient fluid. If forced convection is being considered, H will be a function of the flow velocity. If conduction alone is to be considered, H is the coefficient of a finite difference representation of Fourier's law. Using Ohm's law ($E = I \cdot R$) and the above equations, the performance of a bead as the voltage is increased can be observed. FIG. 2 shows a typical thermistor performance plotting voltage as a function of current. One can observe that a maximum in voltage is reached after only a few milliamperes are put through the bead. For currents greater than this, less voltage is needed so that unchecked, an infinite current would flow through the bead. This phenomenon is commonly referred to as thermal runaway and in practice current regulators in circuits prevent this from happening. If the thermistor is operated at currents above the maximum point of voltage in the Figure, one is assured that the current will always be at its maximum and the "anemometer" will be operating in a constant current mode. If this was not the case, changes in flow could also result in changes of the current. The major heat transfer process occurring in a heated thermistor bead exposed to a flow is forced convection. The heat transfer coefficient shown above is proportional to a non-dimensional Nusselt number defined as:

$$Nu = A + B\, Re^n \quad (3.)$$

where A and B are arbitrary constants and Re is the Reynolds number which is linearly proportional to the velocity. The exponent "n" is critical, being usually on the order of 0.5 for heated cylinders in a flow, and is highly dependent on many things including geometry.

Figure 5:
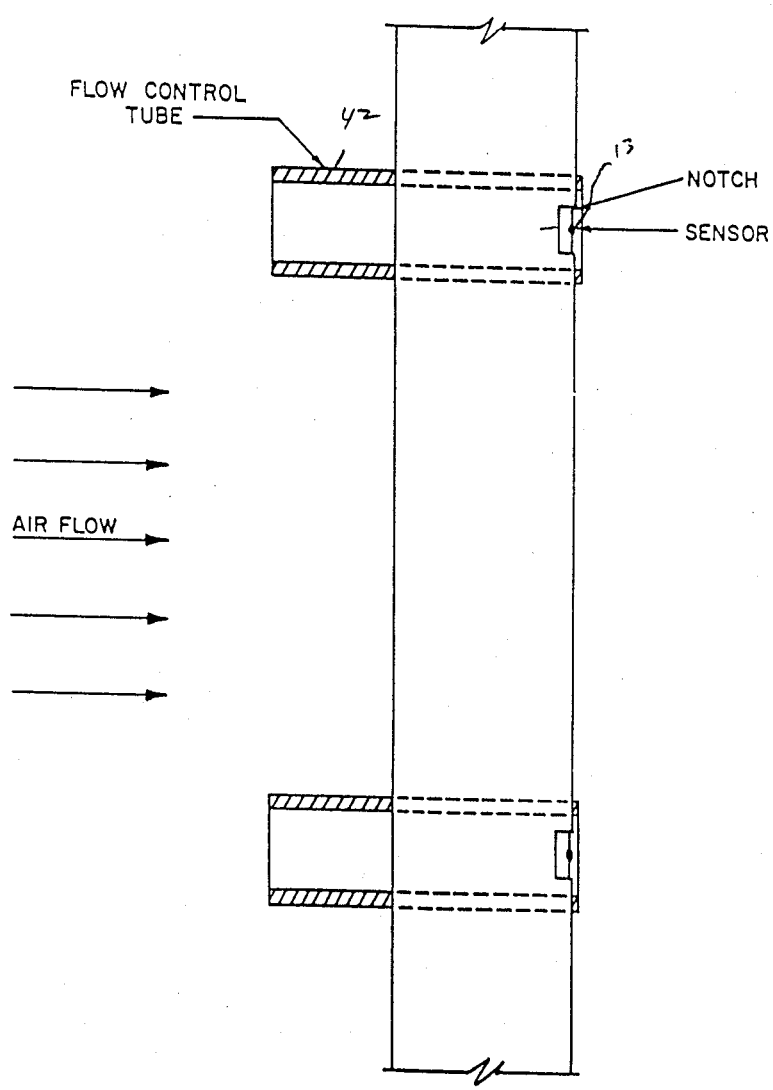
FIG. 5 is a schematic view of a thermistor bead assembly on a trailing edge in a notch of a strut with a flow control cylinder shroud forming parts of a first and second embodiments.
Figure 6:
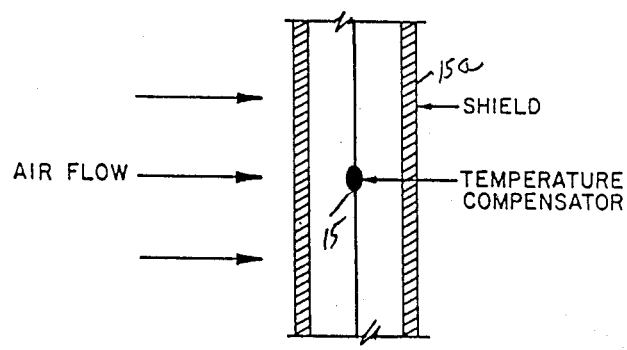
FIG. 6 is a schematic view of a shielded thermistor (temperature compensator) forming parts of the first and second embodiments.

The present invention is based for the most part on the fact that a linear relationship between flow speed and output voltage (n=1) is obtained in a thermistor array where the thermistor beads are located on the downsteam trailing edge of a non-lifting airfoil, recessed into a notch, (as shown in FIG. 5), and centered substantially at the exit of a right circular cylinder oriented in the direction of flow (also shown in FIG. 5). The cylinder shrouding the thermistor bead is also an important contributer to the overall linearity of the device because in practice, flows in ducts are highly turbulent and contain a large amount of swirl. The "self-heated" thermistors are sensitive to a flow from any direction, and the flow straightening cylinders allow only that component of the flow which is in the downstream direction to cross the sensors.

Figure 3:
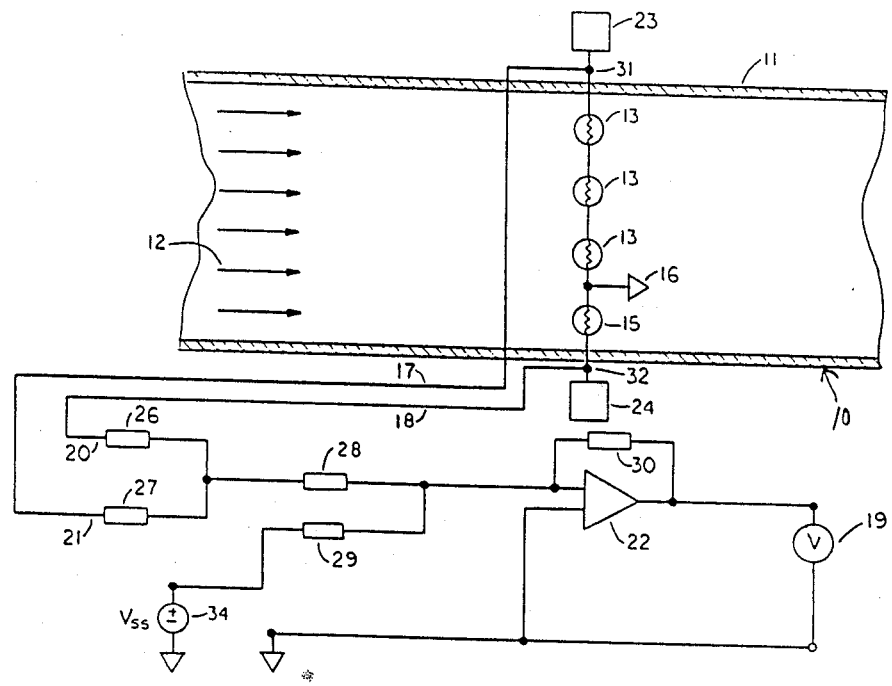
FIG. 3 is a schematic view of a first embodiment of the invention.

In accordance with the first embodiment of the invention, the device generally indicated by reference character 10, and schematically illustrated in FIG. 3 is installed in a generally square or rectangularly shaped air conditioning conduit 11 through which air flows in the direction indicated by arrow 12.

Lying in the path of the air flow 12 is a plurality of thermistors 13. Thermistors 13 are connected in series and heated to a given ambient temperature. Thermistors 13 carry a positive electrical current of controlled magnitude provided by current regulator 23. This controlled current results in a constant resistance value across the network (thermistors 13) which produces a positive voltage change at point 31, for a given ambient temperature. A temperature compensating thermistor 15 is provided with a shield 15a to prevent direct exposure of the thermistor 15 to the air flow, within the conduit 11, but nevertheless sensitive to changes in ambient temperature. This thermistor 15 is also heated to a given ambient temperature by a negative electrical current of controlled magnitude provided by current regulator 24. This controlled current results in a constant resistance value across thermistor 15, which produces a negative voltage change at point 32. One side of thermistors 13 and 15 are connected to point 16, while the other sides of the thermistors are connected to their respective current regulators 23 and 24.

When thermistors 13 experience air flow, the resistance of the same rises due to the cooling effect the air flow produces. Since the resistance rises because of the air flow, the rise will produce a voltage change at point 31. The voltage change is proportional to the amount of air flowing past it. Thermistor 15 will produce no voltage change at point 32 as long as the ambient temperature remains constant. If the ambient temperature should change, thermistor 15 will produce a voltage change which is proportional to the ambient temperature change; this balances a similar change due to ambient temperature that occurs in thermistors 13.

At point 31, conductor 17 carries the voltage change from thermistors 13 to the one side of resistor 26, while at point 32, conductor 18 carries the voltage change to one side of resistor 27. Resistor 27 is proportional to resistor 26 by the number of thermistors 13 that are connected in series. Thus, if there are three thermistors 13 in series, then resistor 27 will be one-third as large as resistor 26. If there were four thermistors 13 in series, then resistor 27 would be one-fourth as large as resistor 26.

The two voltage changes from resistors 26 and 27 are then added together and connected to one side of resistor 28. Voltage source 34 is connected to one side of resistor 29 which is then added with the other side of resistor 28. Voltage source 34 is used to set the lower velocity limit of the air flow monitoring device, and is set to a predetermined value at the time of calibration. After the voltages from resistors 28 and 29 have been added together, they are inputted into the operational-amplifier 22. This inputted voltage is then amplified, with resistor 30 serving to set the upper velocity limit of the air flow monitoring device. Resistor 30 is set to a predetermined value at the time of calibration. This resultant output from the operational-amplifier 22 is then connected to volt-meter 19. Volt-meter 19 then displays a signal proportional to the velocity of the air flow, in conduit 11.

Figure 4:
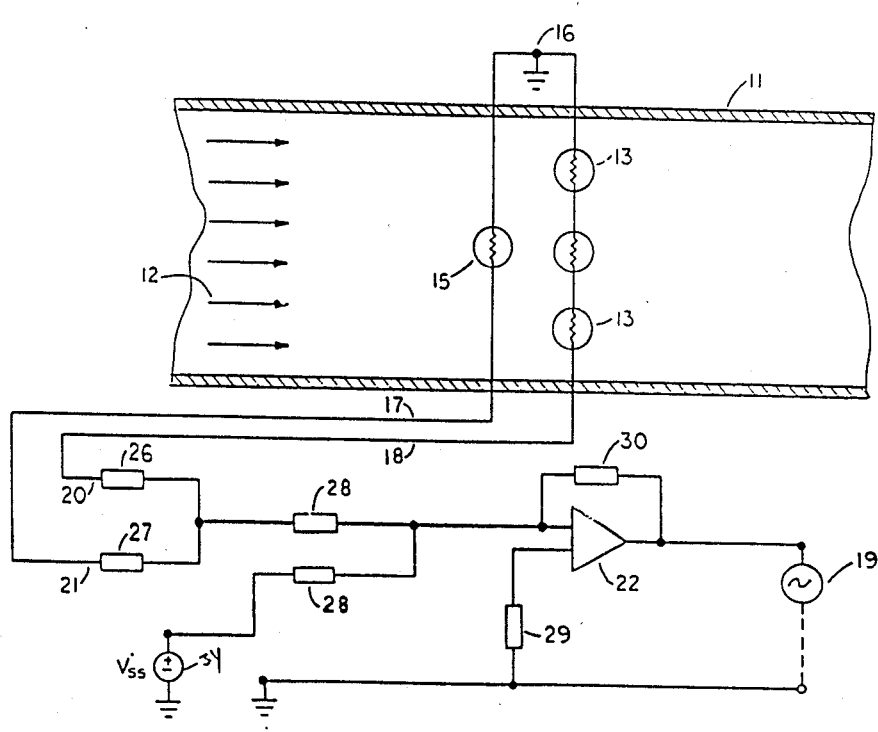
FIG. 4 is a schematic view of a second embodiment of the invention.

The second embodiment, illustrated in FIG. 4 differs principally in the elimination of members 23 and 24 and the relocating of member 29 to be grounded directly, rather than through member 34.

Referring again to FIG. 5, a strut 40 supports plural sensors 13 within notches 41 as described in the above mentioned co-pending application. Surrounding the sensors 13 are cylindrical flow control tubes which serve to collimate the air flow. It will be observed that the sensors are positioned slightly inwardly of the downstream end of the tubes 42, thus completely shielding the sensors from turbulent air flow. This is particularly important where some of the sensors are located in areas within a duct which are subject to more turbulence than others.

Figure 7:
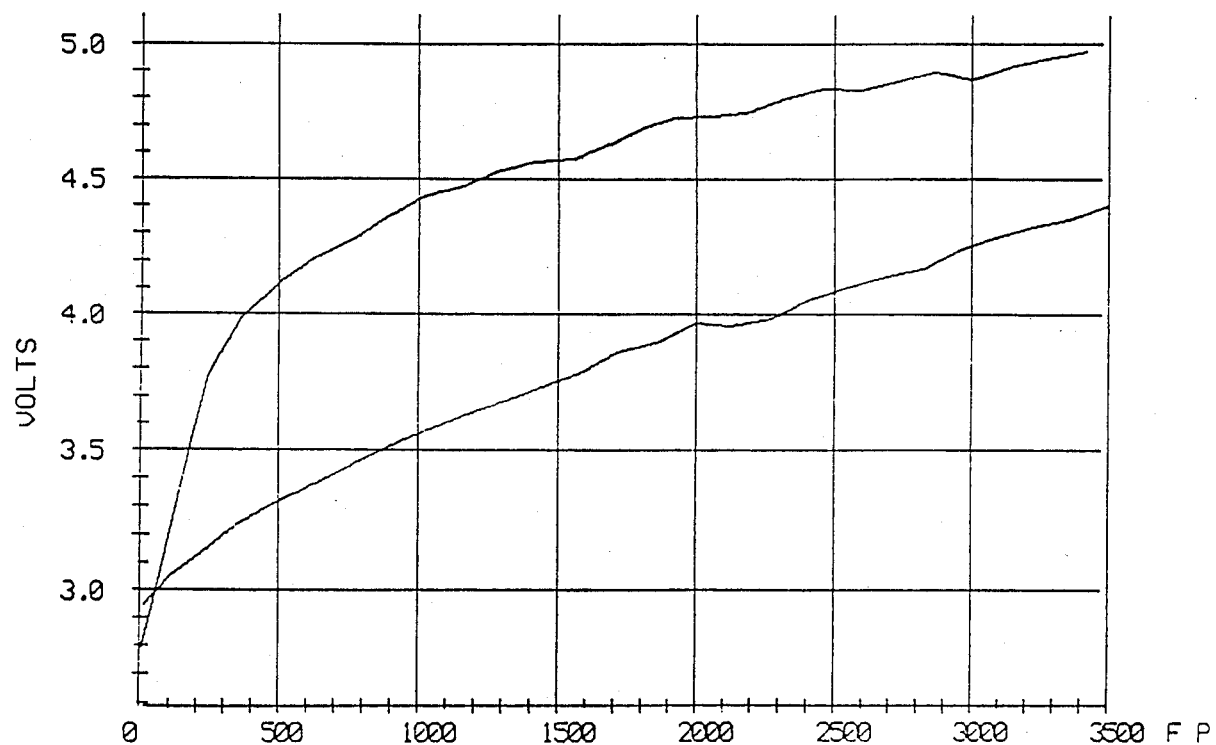
FIG. 7 is a graph showing the comparison of performance obtained using or omitting a flow control cylinder shroud.

FIG. 7 presents results which show that the control tubes 42 greatly improve the linearity of the sensors significantly improving their usefullness, especially in cases where a plurality of sensors are used.

Exhaustive testing has produced a large amount of results. For brevity only two data sets will be shown here. They are presented as two curves on one plot shown in this Figure. Both curves show typical results of experiments which were performed with similar procedures. In each case, a smooth flow was generated in a wind tunnel and passed over a thermistor sensor. To obtain the data sets shown, the flow speed in the wind tunnel was varied more than twenty times and the output from the "self-heated" thermistor (presented as a voltage output using circuitry substantially the same as shown in the disclosed embodiments) was recorded as a function of flow velocity from 0 to 3500 feet per minute. The results are presented as a graph of voltage output versus velocity.

In the first case (which is the upper curve in the Figure) the thermistor was fully exposed to the flow without being on the trailing edge of a transversely extending support or enclosed within a right circular cylinder. The second curve (the lower curve in the Figure) was obtained using a single thermistor arranged in accordance with the embodiments described above in that it was located in a notch on the trailing edge of a transversely extending support located substantially in the center of the exit of a circular cylinder aligned with the flow direction.

The results clearly show that the thermistors arranged in a geometry discussed in the disclosed embodiments is significantly more "linear" than the signal put out by a bead which was completely exposed to the flow. The upper curve is highly curved up until a value of about 1500 FPM whereas the lower curve shows that the output from the device disclosed in this invention remains linear (essentially a straight line) below a value of 400 FPM. The upper curve can clearly be more accurately modeled by a square root type equation, while the lower curve is best described by a straight line. This extension of the straight line correlation is essential in making thermal anemometers useful in duct flow measuring devices.

I wish it to be understood that I do not consider the invention limited to the precise details of structure shown and set forth in this specification, for obvious modifications will occur to those skilled in the art to which the invention pertains.

I claim:

1. In an improved means for measuring mass flow in a gas by thermal anemometry comprising a thermistor bead located at the downstream end of a support extending perpendicular to the axis of gas flow; said thermistor being "self-heated" such that the current through the thermistor can be maintained by a current regulator; the improvement comprising: a hollow right circular cylinder, the axis of which is oriented in the direction of flow, said thermistor being centered substantially at the exit of said cylinder, whereby the output voltage from the sensor is substantially linear with respect to flow velocity.

2. An improved means for measuring air flow over a large cross-sectional area of a conduit comprising: at least one support extending perpendicular to the axis of gas flow within said conduit, a plurality of hollow right circular cylinders supported by said support, a plurality of thermistor beads located at the downstream end of said cylinders, said thermistor beads being "self-heated", said thermistor beads being connected in series and located within said area at generally equally spaced intervals, said thermistor beads being of substantially similar resistance, and a differential amplifier providing a sum of the voltage drops across all of the thermistor beads, whereby said means provide a true average measure of the fluid flow within the conduit due to the linear response of the individual sensors to changes in velocity.

* * * * *